United States Patent
Sabaa et al.

(10) Patent No.: US 6,389,016 B1
(45) Date of Patent: May 14, 2002

(54) DATA COMMUNICATION SYSTEM AND METHOD FOR TRANSPORTING DATA

(75) Inventors: Amr Gaber Sabaa, Nepean; Piotr Konrad Tysowski, Waterloo; Kadir Ozdemir, Ottawa, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/172,631

(22) Filed: Oct. 14, 1998

(51) Int. Cl.[7] .............................................. H04L 12/56
(52) U.S. Cl. ...................... 370/389; 370/394; 370/231
(58) Field of Search ................................. 370/389, 392, 370/394, 395.1, 396, 398, 400, 465, 473, 474, 352, 353, 231, 242, 249

(56) References Cited

U.S. PATENT DOCUMENTS

| | | | |
|---|---|---|---|
| 5,210,751 A | 5/1993 | Onoe et al. ................. | 370/94.1 |
| 5,235,595 A | * 8/1993 | O'Dowd ...................... | 370/392 |
| 5,386,412 A | * 1/1995 | Park et al. ................... | 370/270 |
| 5,740,373 A | * 4/1998 | Isaka .......................... | 709/237 |
| 6,128,283 A | * 10/2000 | Sabaa et al. ................. | 370/236 |

OTHER PUBLICATIONS

Software Patent Institute Database of Software Technologies; http://www.spi.org/cgi–bin/newqry?... ec=1&submit= seeit&csum=13768870794; Serial No. TDB1181.0045; 3 pages; Jun. 17, 1998.
Go–Back–N Error Recovery; http://www.erg.abdn.ac.uk/users/gorry/course/dl–pages/gbn.html; p. 1 of 1; Jun. 17, 1998.

* cited by examiner

Primary Examiner—Dang Ton
Assistant Examiner—Brian Nguyen (57) ABSTRACT

In a data communication system, a sending entity divides data into a plurality of groups, each of which is segmented into a plurality of packets, and then sequentially transmits the packets in each group to the receiving entity. The receiving entity receives each packet, and determines whether the packet is sequentially received in a group. When an out-of-sequence error arises, the receiving entity discards the received packet, and sends a negative acknowledgment to the sending entity if no negative acknowledgment has been sent for the group. Only a single negative acknowledgment is sent for the group until an expected packet is received. When all packets of the group are received, the receiving entity sends a positive acknowledgment to the sending entity.

32 Claims, 8 Drawing Sheets

DATA COMMUNICATION SYSTEM AND METHOD FOR TRANSPORTING DATA

This invention relates to a data communication system and method for transporting data, and more particularly, to a data communication system and method for controlling error recovery for one-way data transported between a sending entity and a receiving entity.

BACKGROUND OF THE INVENTION

In data communication systems, it is important that a sending entity and a receiving entity implement a mechanism to guarantee correct reception of transmitted data.

In fixed-size data communication networks, such as Asynchronous Transfer Mode (ATM) networks, data is segmented into fixed-sized packets. The packets are transported and received in order. However, due to noise in the networks, some packets may be lost or corrupted during transmission in the networks. The presence of noise in the networks requires that data transport systems be designed such that transmitted data will eventually be delivered correctly to the receiving entity even if initial attempts fail due to lost or corrupted packets.

One of common error recovery system is a system that uses acknowledgment packets. The receiving entity acknowledges correct reception of packets by responding with positive acknowledgment (ACK) packets. If an expected data packet does not arrive, no positive acknowledgment is sent to the sending entity. Thus, the lack of receiving an acknowledgment within a predefined time triggers the sending entity to retransmit the original packets. This system requires many redundant acknowledgment packets.

Another common error recovery system is a "selective repeat" system. Traditional "selective repeat" systems work by buffering out-of-sequence messages on the receiving entity side as packets are received, then requesting re-transmission of the original undelivered expected packet by utilizing a negative acknowledgment (NACK). Once the expected packet is received, the expected packet and the following packets, which were buffered, are assembled and sent to be processed by the upper layer on the receiving entity side.

This system minimizes the number of retransmitted packets, but it requires significant hardware complexity on the receiving entity side. In the case of embedded hardware, where space and cost must usually be kept to a minimum, this approach is unrealistic. The receiving entity would need to implement a time-out mechanism in the case of a lost NACK, and it would need to buffer out-of-sequence packets until the original expected packet was successfully received. Specifically, this would require additional hardware complexity, including a timer and dedicated memory to hold the buffered packets. This is impractical in many small, embedded hardware systems. This is especially true in high-speed networks, where data is divided into a plurality of groups of packets and the size of a group is large for maximum network utilization and a large memory would be required to contain all buffered packets in the group.

Also, in a traditional system, a negative acknowledgment message is sent by the receiving entity for each and every received out-of-sequence packet. This results in excessive and undesired redundant traffic, especially for large group sizes. Furthermore, burst errors due to noisy periods on the transmission medium would result in a sequence of packets being lost and hence a generated burst of NACK's of the same number as the lost data packets.

Another common error recovery system is a "Go-Back-N" error recovery system. When a packet or frame is lost and an out-of sequence frame is received, a receiving entity requests retransmission of the lost frame and the successive frames by sending a reject frame indicating the lost frame. The receiving entity continues to discard received frames until one is received with the expected sequence number. This system reduces undesired negative acknowledgment traffic. However, it still requires apositive acknowledgment for each frame.

U.S. Pat. No. 5,210,751 issued on May 11, 1993 to Onoe et al discloses a signal transmission system which is designed for a mobile communication system whose transmission paths have relatively low reliability. In this system, it is assumed that the sender and receiver are synchronized using time slots. The receiver utilizes the length of the message and time slots information to detect lost messages. The patent does not propose any new retransmission control mechanism. Instead, it uses well known retransmission mechanisms, such as a Go-Back-N error recovery system, a selective repeat system or a combination thereof.

U.S. Pat. No. 5,740,373 issued on Apr. 14, 1998 to Isaka discloses a packet switching system in which a source node sequentially sends a plurality of cells to a destination node via a communication control. The destination node generates receive response data indicative of whether or not the cell has been normally received. The communication control unit detects the last cell and stores it for generating a response cell on the basis of the contents of the receive response data received from the destination node. While the control unit sends a single response cell, the destination node is still required to generate a receive response data for each received cell. The system does not use any negative acknowledgment.

It is therefore desirable to provide a reliable and highly efficient communication system and method for transporting data between a sending entity and a receiving entity which requires relatively low complexity.

SUMMARY OF THE INVENTION

An object of the present invention is to provide a reliable and highly efficient communication system and method for transporting data between a sending entity and a receiving entity in which the complexity of the receiving entity is required to be low.

To this end, the present invention uses a positive group acknowledgment and a single negative acknowledgment for lost packets. A sending entity divides the data into a plurality of groups, each of which is segmented into packets. The sending entity sequentially transmits the packets of each group. A receiving entity receives sequentially the packets transmitted from the sending entity. When one or more packets are lost or collapsed during the transmission, an out-of-sequence packet is received. The receiving entity discards the out-of-sequence packet and sends a negative acknowledgment to the sending entity to request retransmission of the lost packet and the subsequent packets. No more negative acknowledgment is sent until an expected packet is received. When all packets of a group are correctly received, the receiving entity sends a positive acknowledgment to the sending entity.

In accordance with an aspect of the present invention, there is provided a method for transporting data between a sending entity and a receiving entity over a data communication system. The sending entity divides data into a plurality of groups which are sequentially indexed with group numbers, each group is segmented into a plurality of packets which are sequentially indexed in each group with sequence numbers. The sending entity sequentially transmits the packets in each group to the receiving entity. The receiving entity receives each packet transmitted over the data communication system, reads a group number identifying a group and a sequence number of the received packet, and compares the sequence number with an expected sequence number of the group. When the sequence number of the received packet matches the expected sequence number, the receiving entity accepts the received packet for further processing, and increments the expected sequence number of the group. When the sequence number of the received packet does not match the expected sequence number, the receiving entity discards the received packet. In this case, if no negative acknowledgment sent indicator has been set for the group, the receiving entity sets a negative acknowledgment sent indicator indicating that a negative acknowledgment has been sent and the receiving entity is waiting for a packet with the expected sequence number, and sends a negative acknowledgment if the sequence number of the received packet is greater than the expected sequence number. When the received packet is a last packet of the group and the sequence number of the received packet matches or smaller than the expected sequence number, the receiving entity sends a positive acknowledgment.

In accordance with another aspect of the present invention, there is provided a data communication system for transporting data between a sending entity and a receiving entity. The sending entity comprises a dividing unit and a packet sending unit. The dividing unit divides data into a plurality of groups which are sequentially indexed with group numbers, each group being segmented into a plurality of packets which are sequentially indexed in each group with sequence numbers. The packet sending unit sequentially transmits the packets of each group to the receiving entity. The receiving entity comprises a receiving unit, an expected sequence counter, an acceptance determining unit, a negative acknowledgment sent indicator, a last packet detector and an acknowledgment sending unit. The receiving unit receives each packet transmitted over the data communication system. Each packet has a group number identifying a group and a sequence number. The expected sequence counter stores an expected sequence number for the group, and is incremented when a received packet is accepted for the group. The acceptance determining unit accepts a received packet when the sequence number of the received packet matches the expected sequence number of the group, and discards the received packet when the sequence number of the received packet does not match the expected sequence number of the group. The negative acknowledgment sent indicator is set when the received packet is discarded and no negative acknowledgment sent indicator has been set for the group, so as to indicate that a negative acknowledgment has been sent and the receiving entity is waiting for a packet with the expected sequence number. The last packet detector for detecting a last packet of the group. The acknowledgment sending unit sends a negative acknowledgment when the sequence number of the received packet is greater than the expected sequence number and the negative acknowledgment sent indicator has not been set, and sending a positive acknowledgment when the received packet is the last packet of the group and the sequence number of the received packet matches or smaller than the expected sequence number.

BRIEF DESCRIPTION OF THE DRAWINGS

The invention will be further understood from the following description with reference to the drawings in which.

DETAILED DESCRIPTION OF THE PREFERRED EMBODIMENTS

Data is transported over a data communication system from a sending entity to a receiving entity.

Figure 1:
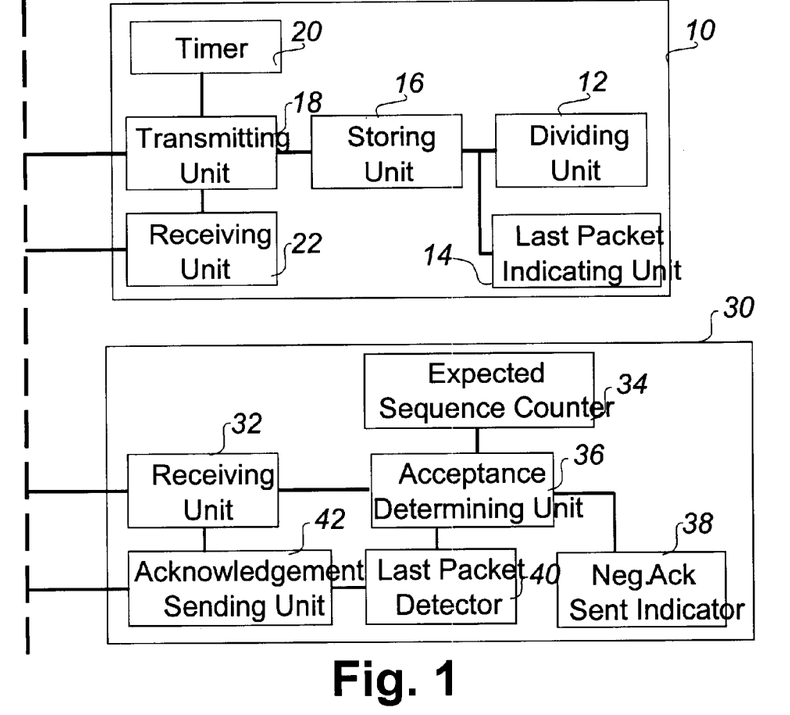
FIG. 1 is a block diagram showing an embodiment of a data communication system in accordance with the present invention.

FIG. 1 shows a sending entity or sender 10 and a receiving entity or receiver 30 of an embodiment of data communication system in accordance with the present invention.

The sender 10 comprises a dividing unit 12, a last packet indicating unit 14, a storing unit 16, a transmitting unit 18, a receiving unit 20 and a timer 22.

The dividing unit 12 divides the entire data into a plurality of independent groups. The groups are sequentially indexed with group numbers. The group number generally starts at zero.

Each group is also segmented into a plurality of packets. Each packet may have a fixed size or a variable size. The last packet in the group may be of a smaller size, depending on the total amount of user data. The packets within each group are sequentially indexed with sequence numbers. The number of packets in each group is dictated by the length of user data represented by the group. The maximum number of packets which can belong to one group is determined by the system. While group numbers must be unique in the entire system, sequence numbers does not have to be unique. The first packet in each group is generally number zero, but may be other than zero when a group number is reused or recycled, as described below. The combination of a sequence number and a group number uniquely identifies a packet in the system at a point in time.

The last packet indicating unit 14 indicates the last packet of a group as such. Then, the packets are stored in the storing unit 16 by group. The sender 10 always stores a copy of all packets belonging to all unacknowledged groups.

The data communication system and method of the present invention may be connection-oriented, although the means by which a connection is established is left for the user to implement for greater flexibility. After a connection has been established between the sender 10 and the receiver 30, the sender 10 sequentially transmits all packets of each group by the transmitting unit 18.

The sender may transmit groups sequentially or in interleaving fashion, and in terms of efficiency these are equivalent. Generally, all packets corresponding to the initial group, group 0, are transmitted first. Groups can finish transmitting out of order. The receiver reassembles the groups based on the group numbers, each of which is unique to each group. The maximum-number of groups that can be transmitted at one time is determined by the system.

Figure 2:
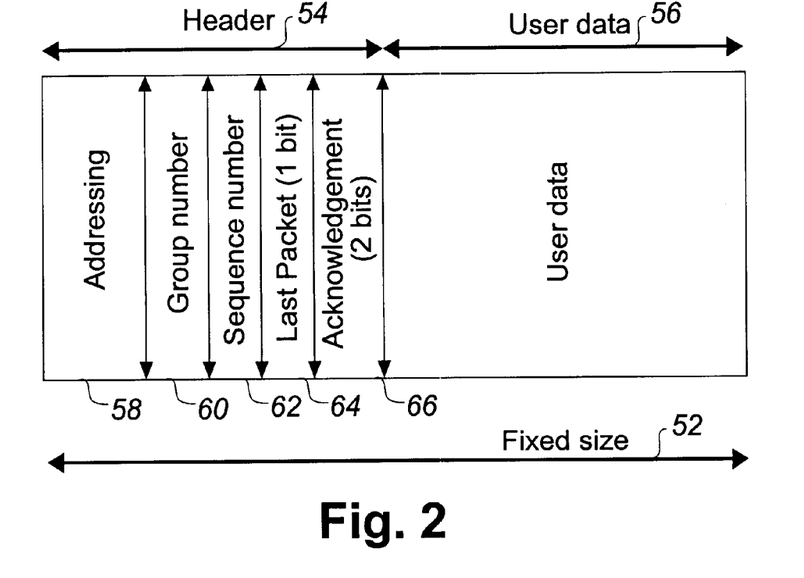
FIG. 2 is a diagram showing an example of a packet used in an embodiment of the present invention.

FIG. 2 shows a preferred example of a packet structure used in the present invention. The packet 50 is a data unit having a size 52, and consisting of a header portion 54 and a user data portion 56. The header portion 54 contains addressing information 58 and optional user-defined protocol control information (not shown).

The header portion 54 also includes the group number 60 and the sequence number 62 of the packet, a last packet single-bit field 64, and an acknowledgment two-bit field 66. The acknowledgment field 66 is used by acknowledgment-type packets sent by the receiver. The last packet field 64 indicates a packet as being the last in a group. This field 64 is set by the sender. Thus, the same packet structure is used by both data packets originating from the sender and acknowledgments originating from the receiver.

Within a single connection, multiple groups may be sent. When the processing and transport overhead for connection and disconnection negotiation is negligible, a connection may be established for every group. In that case, the group number 60 does not have to be specified in acknowledgment packets, as it will be implied in the connection-related addressing portion of the packet header.

The embodiment of the present invention is described using the packet structure shown in FIG. 2. However, other packet structures may be used to implement the present invention.

Referring back to FIG. 1, the receiver 30 comprises a receiving unit 32, an expected sequence counter 34, an acceptance determining unit 36, a negative acknowledgment sent indicator 38, a last packet detector 40, and an acknowledgment sending unit 42.

The receiver 30 receives sequentially by the receiving unit 32 the packets transmitted from the sender 10 over the communication system. The acceptance determining unit 36 is connected to the receiving unit 32, and determines whether it will accept or discard a received packet in view of the value of the expected sequence counter 34, as described below.

When transmission of all packets goes well, the receiver receives all packets without any additional communication with the sender, except in the case of the last packet in the group. The last packet has its last packet bit set. When the last packet detector 40 detects a packet with this property, the receiver 30 sends a positive acknowledgment packet to the sender 10 by the acknowledgment sending unit 42 with the acknowledgment field set to indicate a positive acknowledgment. It is preferable that, in a known location in the user data portion of the packet, the group number of the group just received in entirety is indicated.

The receipt of the last packet of a group is the only stimulus for generating a positive acknowledgment on the receiver. Thus, a group of all packets is acknowledged by a single positive acknowledgment. This scheme avoids the redundancy of acknowledging every packet and an inefficient stop-and-wait mechanisms, resulting in high utilization of network bandwidth. No timer mechanism exists and no out-of-sequence packet buffering is necessary on the receiver, resulting in a very simple and quick hardware implementation of the receiver.

This is similar to a positive group acknowledgment method described in copending U.S. patent application Ser. No. 08/984,191 filed on Dec. 3, 1997 by Sabaa et al and assigned to the same assignee as the present invention, which application is hereby incorporated by reference. This system is designed to be used on relatively error-free medium, such as fibre-optic channels, and-no negative acknowledgments are implemented.

After sending the last packet of a group, the sender 10 starts the timer 20 for the group, whose timeout value is set to a sum of an expected transmission time, a propagation time of the last packet and a single acknowledgment, and some padding time to allow for receiver processing time.

When receiving unit 30 receives the positive acknowledgment via a receiving unit 22, the sender 10 stops the timer 20 for the corresponding group, and discards the copy of all packets in the group from the storing unit 16.

The sender 10 does not wait for a positive acknowledgment of a group before starting transmission of another group, so that multiple groups are being transmitted concurrently. A timer is set for every group that is transmitted by the sender.

The receiver 30 is selective about which packets it will accept. It maintains a record of the next expected sequence number for each group using the expected sequence counter 34. The expected sequence number generally starts from zero and is incremented when a received packet is accepted. When the group number is reused, the next sequence number of the group used previously will be the initial expected sequence number of the group, as disclosed later.

The acceptance determining unit 36 determines whether the sequence number of the received packet matches the expected sequence number of the counter 34. If the sequence number of the received packet matches the expected sequence number, the received packet is accepted, and can immediately be processed by an upper layer while further packets are being received.

If the receiver receives a packet for a group with a sequence number different from the expected value of the group, the receiver discards the received packet, and an out-of-sequence error condition arises. The receiver sends to the sender an acknowledgment packet by the acknowledgment sending unit 42 with the acknowledgment field set to indicate a negative acknowledgment. It is preferable that in a known location of the user data portion of the packet, the group number and sequence number of the expected packet are indicated.

Following the reception of the negative acknowledgment by the receiving unit 22, the sender 10 retransmits to the receiver 30 by the transmitting unit 18 the packet with the expected sequence number and the group number as indicated in the negative acknowledgment, and the packets having higher sequence numbers in the group. When the last packet of the group is transmitted, the timer 20 for the group is restarted.

When a negative acknowledgment is sent by the receiver 30, no further negative acknowledgments is sent for that group until a packet with the expected sequence number of the group is received, regardless of any additional out-of-sequence errors detected. Once the expected packet of the group is received, another negative acknowledgment will be sent should and out-of-sequence error occur again.

In order to prevent redundant negative acknowledgment from being sent, the receiver 20 is provided with the negative acknowledgment sent indicator 38 to keep track as to whether a negative acknowledgment has been sent and the receiver is waiting for the expected packet to arrive for each group. The indicator 38 is preferably a single bit in the receiver 30. If this bit is set to indicate that a negative acknowledgment has been sent and the expected packet has not been received, the receiver does not send any additional negative acknowledgments. The negative acknowledgment bit is reset when the expected packet of the group is correctly received.

This system prevents a negative acknowledgment from being sent for every unexpected packet that arrives in a group as the result of a single data-packet loss. By sending only a single negative acknowledgment per burst error, negative acknowledgment traffic overhead and retransmission triggered by the negative acknowledgment are minimized. When compared with the above identified copending U.S. application, the most significant advantage of this system is that for relatively large group sizes, there is enormous saving in retransmission traffic overhead because the sender starts retransmitting all sequence numbers in the group starting at the point of the lost packet, not from the beginning of the group. On average, the retransmission traffic is reduced by one half compared to a system described in the above identified copending U.S. patent application. This is important, especially in noisy networks where bandwidth efficiency and cost is at a premium.

If the last packet or the positive acknowledgment of a group is lost during transmission, the timer 20 of the group at the sender expires before receiving a positive acknowledgment. Upon expiration of the timer 20, the sender 10 retransmits all packets of the group to the receiver 30. The sender restarts the timer after the last packet is retransmitted.

When the all packets of the group are retransmitted to recover a lost positive acknowledgment, the expected sequence counter 34 has been incremented when the last packet was initially accepted. Thus, the sequence number of the retransmitted last packet is smaller than the expected sequence number. In this case, the acceptance determining unit 36 discards the received packet, but the last packet detecting means 40 still triggers transmission of another positive acknowledgment by the acknowledgment sending unit 42. By contrast, if there are no transmission errors for the positive acknowledgment, only one positive acknowledgment is ever sent per group.

If a negative acknowledgment is lost during transmission to the sender 10, the sender behaves as if the negative acknowledgment had not existed, and after transmitting the last packet of the group, a timeout of the timer 20 occurs as in the case of the loss of a positive acknowledgment. Thus, the sender 10 retransmits the entire group to the receiver 30, and reliability of the system is maintained.

Groups of packets are transmitted until all user data has been sent, or an error occurs, as indicated by a time-out or receipt of a negative acknowledgment. After all groups have been sent and acknowledged, or a group has been retransmitted unsuccessfully more than a present number of times, the sender can negotiate or simply force a disconnection, as appropriate.

Due to delays in packet loss and retransmission, groups may be received correctly out of order. This is not deemed to be a problem as each group contains independent data. The user application determines how data is segmented into groups.

After a group is acknowledged as having been received correctly, its group number may be reused or recycled by a new group containing new data in the future after all other possible group numbers have been exhausted. The sequence number of the first packet in this reused group number will not necessarily start at zero, but rather at the last sequence number used for this group number plus one. If this last sequence number was already the maximum possible sequence number, the new sequence number will wrap around to zero. This scheme of not always restarting the sequence number at zero for reused groups will prevent a new group being confused with a previously correctly received group of the same group number being retransmitted as a result of a lost positive acknowledgment. The sender keeps track of the last sequence number sent for each group so that it knows what sequence number should be assigned to the first packet of a new group reusing an old group number. The receiver already does this as it always remembers the next expected sequence number for all groups.

Figure 3:
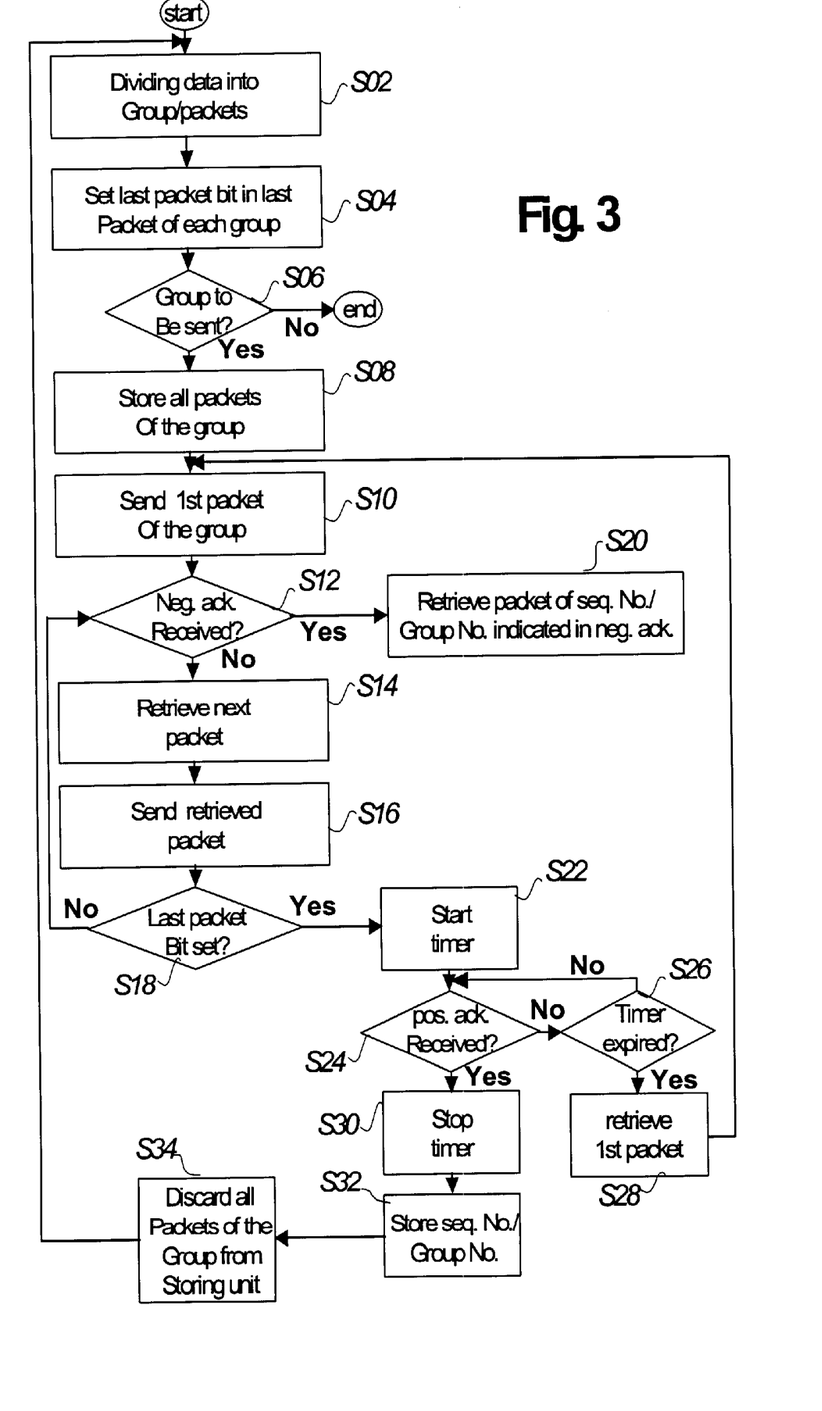
FIG. 3 is a flowchart showing a process followed by a sending entity of an embodiment of the present invention.

Referring to FIG. 3, the operation at the sender 30 is described. The sender divides data into groups and each group into packets (S02), and sets a last packet bit for the last packet of each group (S04). When the sender has a group to be sent to the receiver (S06), it stores a copy of all packets of the group (S08). Then, the sender starts to send the packets sequentially from the first packet in the group (S10). Unless a negative acknowledgment is received (S12), the sender repeats retrieving the next packet (S14) and sending the retrieved packet (S16) until the packet sent is the last packet of the group, i.e. the last packet bit is set (S18).

If a negative acknowledgment is received (S12), the sender retrieves a packet having the sequence number and the group number indicated in the negative acknowledgment (S20). Then the operation flow goes to the step of sending the retrieved packet (S16) so that the packet and all subsequent packets of the group will be retransmitted.

When the packet sent is the last packet (S18), the sender starts a timer for the group (S22). If the timer expires (S26) before receiving a positive acknowledgment (S24), the sender retrieves the first packet (S28) and repeat the above steps from step S06. Thus, all packets of the group will be retransmitted.

When a positive acknowledgment for the group is received from the receiver (S24) before the timer expires, the sender stops the timer (S30), stores the sequence number and the group number (S32), and discards the copy of the packets of the group from the storing unit (S34). The operation flow returns to Step S06 until all groups are transmitted. Although FIG. 3 does not show, multiple groups may be processed concurrently.

Figure 4:
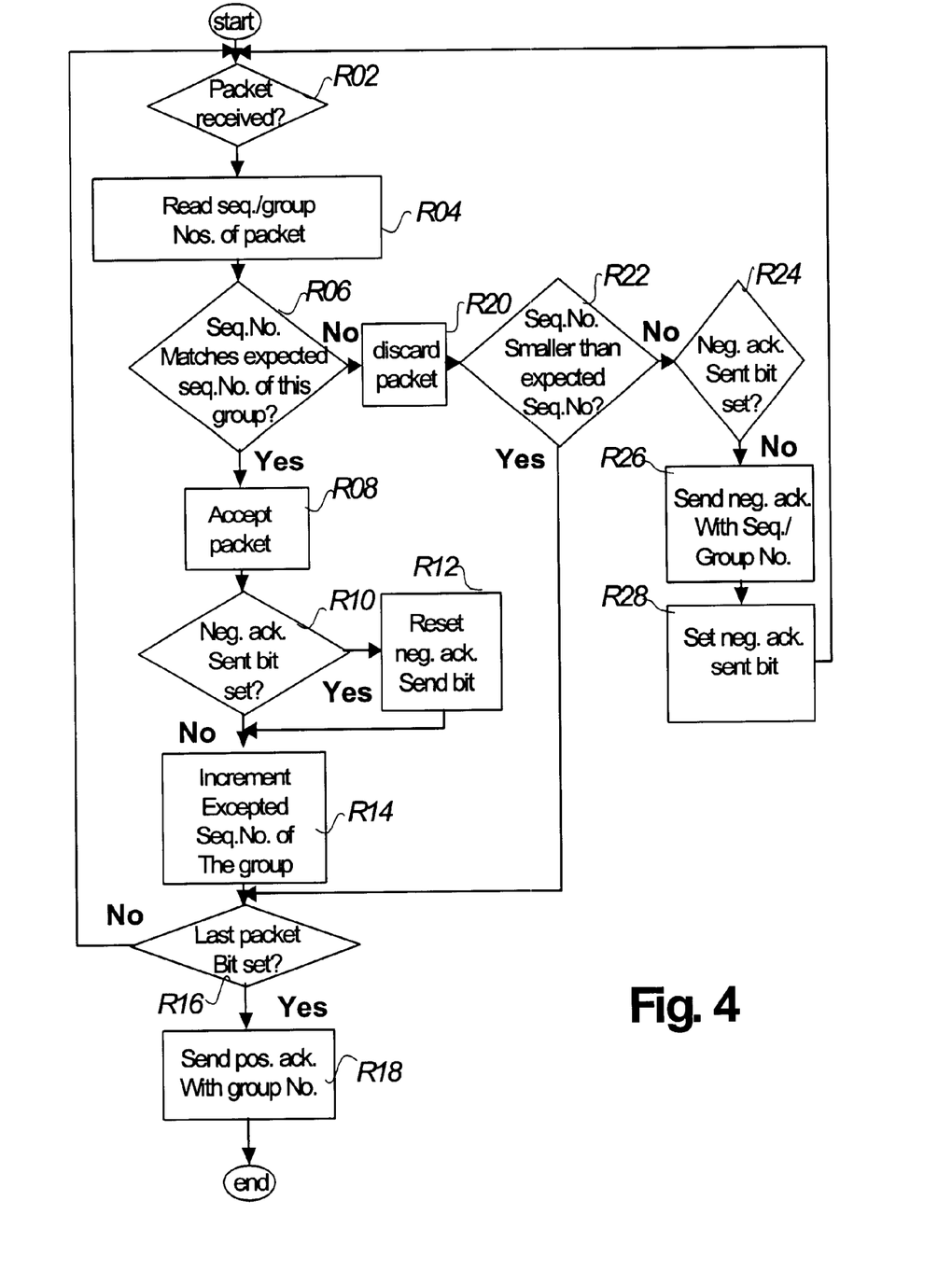
FIG. 4 is a flowchart showing a process followed by a receiving entity of the embodiment of the present invention.

Referring to FIG. 4, the operation at the receiver is described. When the receiver receives a packet (R02), it reads a group number indicating a group and a sequence number of the received packet (R04) and compares the sequence number with an expected sequence number of the group (R08).

If the sequence number of the received packet matches the expected sequence number, the receiver accepts the received packet for further processing (R10). Then, it checks if a negative acknowledgment bit is set (R10). If it is set, the receiver resets the negative acknowledgment bit (R12). The receiver increments the expected sequence number of the group (R14). If the received packet has a last packet bit set (R16), the receiver sends a positive acknowledgment to the sender, indicating the group number (R18).

If the received packet does not have the last packet bit set (R16), the receiver returns to the step R02 to receive the next packet.

If the sequence number of the received packet does not match the expected sequence number of the group (R06), the receiver discards the received packet (R20). If the sequence number of the received packet is smaller than the expected sequence number (R22), the receiver checks if the last packet bit is set (R16). If the sequence number of the received packet is greater than the expected sequence number (R22), the receiver further checks if the negative acknowledgment bit has been already set (R24). If it has not been set (R24), it sends a negative acknowledgment to the sender, indicating the sequence number and the group number (R26), and sets the negative acknowledgment bit (R28). The operation flow returns to the step R02 to receive the next packet. If the negative acknowledgment bit has been already set, the receiver returns to step R02 and repeats the same steps of R02 to R06 and R20 to R24 until it receives the expected packet (R06).

FIGS. 5–9 show diagrams illustrating examples of data transmission in accordance with the present invention in several distinct possible situations.

Figure 5:
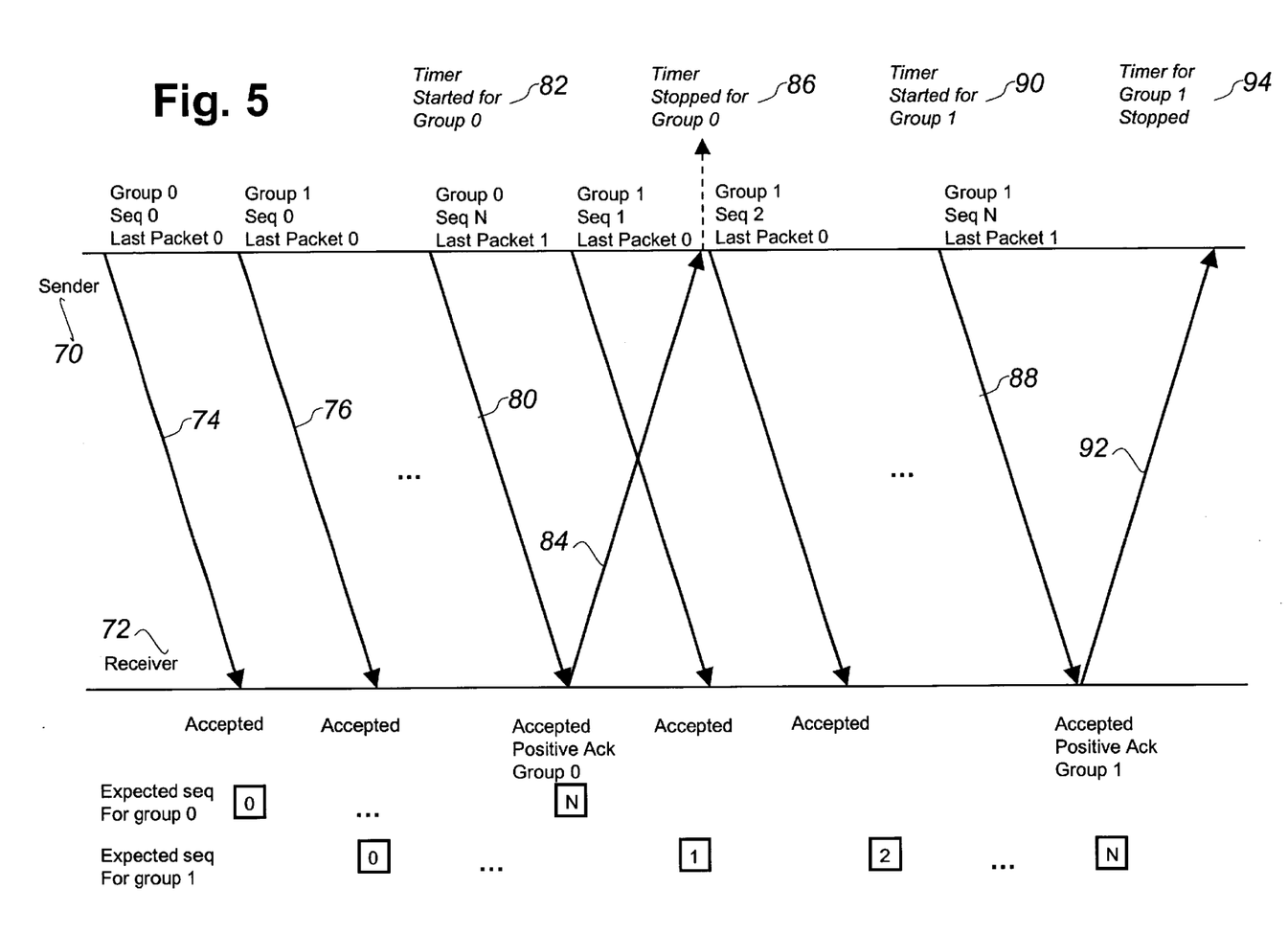
FIG. 5 is a diagram showing an example of data transmission in accordance with the embodiment of the present invention.

FIG. 5 represents an example of successful transmission of multiple groups from sender 70 and receiver 72. The sender 70 sends sequentially packets 74 of the first group, Group 0, which is interleaved in no particular pattern with transmission of packets 76 of the second group, Group 1. The last packet 80, 88 of each group has its last packet bit set to "1". The timers 82, 90 for each group are started once the last packets 80, 88 of the groups are transmitted. During the transmission of the second group, a positive acknowledgment 84 for the first group is received by the sender 70. In response to the positive acknowledgment 84, the sender stops the timer for the first group 86. Also, when the last packet 88 of the second group has been correctly received, the receiver 72 sends a positively acknowledgment 92 for this group. The sender 70 receives the positive acknowledgment 92 and stops the timer for the second group 94.

Figure 6:
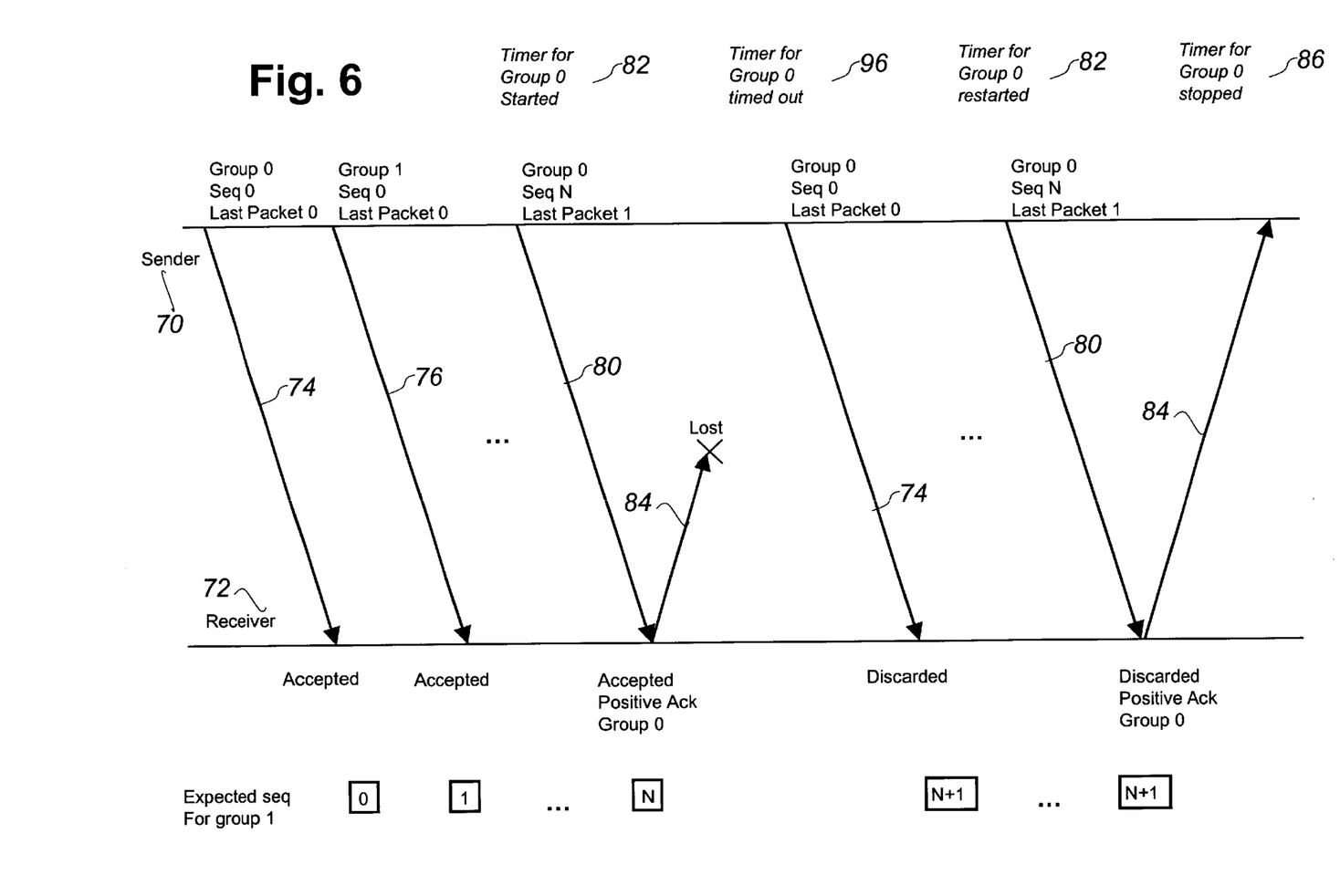
FIG. 6 is a diagram showing an example of data transmission in accordance with the embodiment of the present invention.

FIG. 6 shows a scenario where a positive acknowledgment is lost during the transmission from the receiver 72 to the sender 70. All packets of Group 0 is correctly received. The last packet 80 in the group triggers a positive acknowledgment 84 to be sent, which is then lost. The sender timer for this group times out 96, and the sender 70 retransmits the entire group from the first packet 74. As the receiver 72 is expecting the next sequence number to be N+1, all the retransmitted packets will be ignored and discarded. The last packet 80 will have its last packet bit set to "1". Even though its sequence number is N which is less than the expected sequence number N+1, any packet with the last packet bit set will cause a positive acknowledgment 84 to be sent. In this scenario, the retransmitted positive acknowledgment 84 is correctly received.

Figure 7:
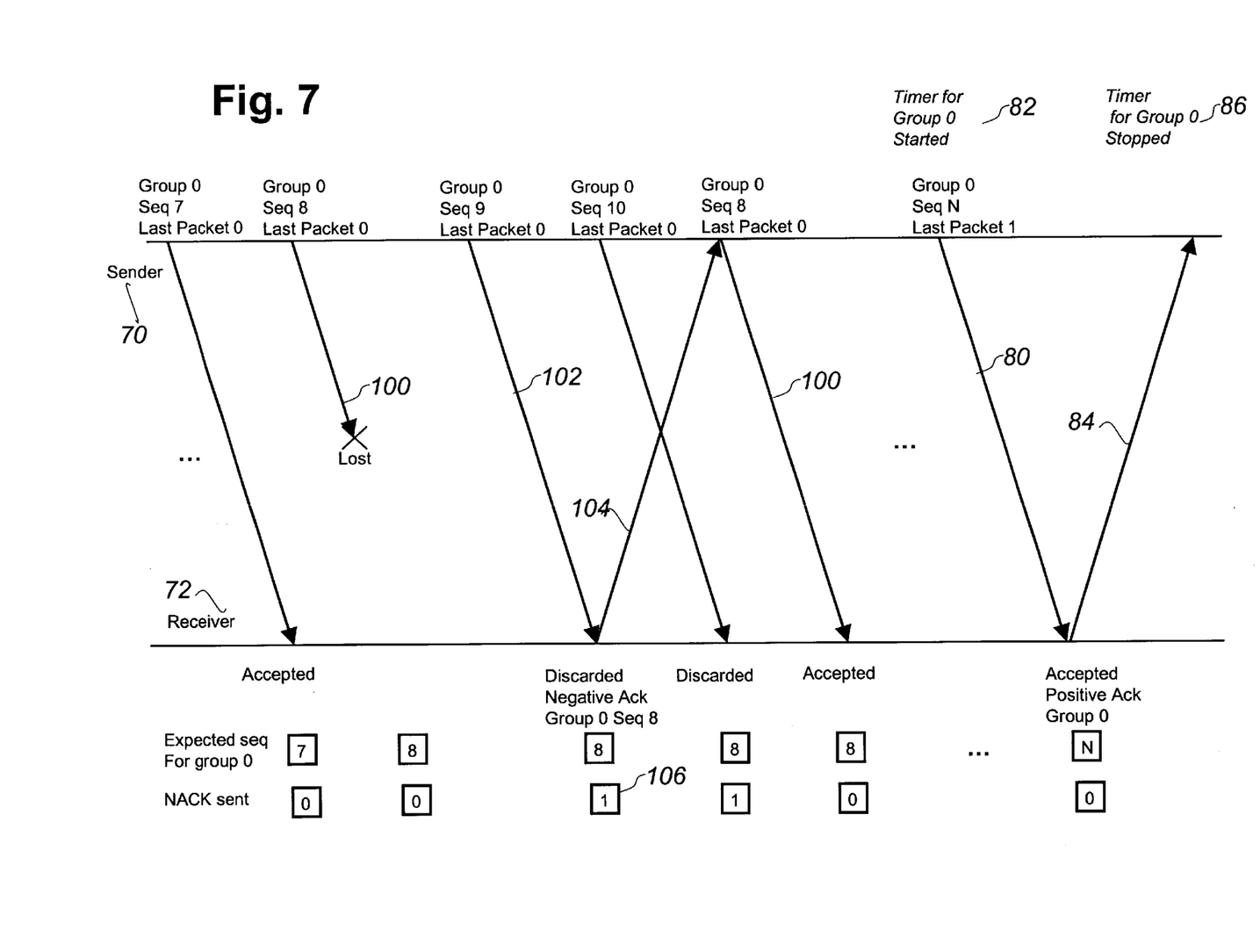
FIG. 7 is a diagram showing an example of data transmission in accordance with the embodiment of the present invention.

FIG. 7 illustrates the scenario of a data packet being lost and the subsequent error recovery. The ninth data packet 100 having sequence number 8 of Group 0 is lost in this scenario. Once the next packet 102 arrives, having a sequence number of 9, the receiver 72 detects an out-of-sequence error as the sequence number of the received packet 102 does not match the expected sequence number of 8. The receiver 72 sends a negative acknowledgment 104 to the sender 70, specifying the expected sequence number. The receiver 72 also sets a bit 106 on the receiver specifying that the negative acknowledgment 104 has been sent for group 0. In the meantime, the receiver 72 discards all further packets received for group 0 until the one expected is received. Once the sender 70 receives the negative acknowledgment 104, it knows at that point that all sequence numbers up to 7 have been correctly received. The receiver then retransmits the packet 100 with sequence number 8, immediately followed by all of the next and higher-numbered packets in the group. Once these are received, the receiver 72 indicates the correct reception of the entire group by sending a positive acknowledgment 84, as usual. The bit 106 specifying that the negative acknowledgment had been sent is cleared upon reception of the expected packet 100, allowing further negative acknowledgments to be sent in the future in the event of another out-of-sequence error. Thus, in the event of an out-of-sequence error, the entire group is not resent; only the packets starting at the lost sequence number are retransmitted. This saves considerable bandwidth, especially for large groups.

If the negative acknowledgment was to arrive after the last packet in the group had already been sent and the timer started, the same behavior would occur, with the exception that the timer would be stopped on receipt of the negative acknowledgment, and restarted once the last packet in the group was retransmitted.

Figure 8:
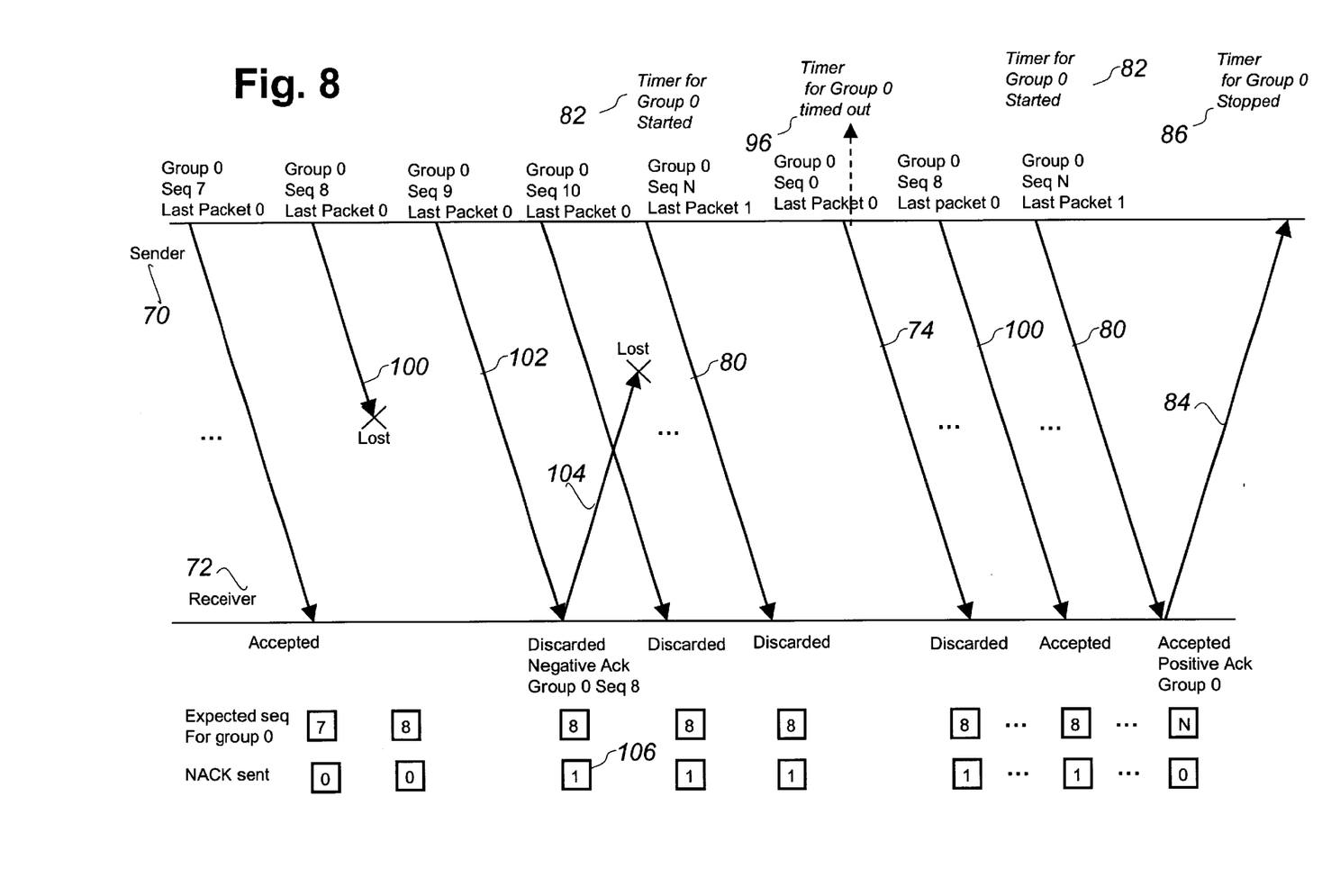
FIG. 8 is a diagram showing an example of data transmission in accordance with the embodiment of the present invention.

FIG. 8 is similar to the previous scenario shown in FIG. 7, with the difference being the loss of the negative acknowledgment 104 en route to the sender 70. In this variation, the timer for Group 0 of the sender 70 times out 96, and the sender 70 retransmits the entire group from the first packet 74, exactly as in the case of a positive acknowledgment being lost as shown in FIG. 6. All retransmitted packets with sequence numbers less than the expected sequence number of 8 are discarded by the receiver 72. The negative acknowledgment sent bit 106 is set when the negative acknowledgment 104 is sent, and no more redundant negative acknowledgments are sent until the expected packet 100 having a sequence number of 8 arrives and causes the negative acknowledgment sent bit 106 to be cleared. Once the last packet 80 in the group arrives, the receiver 72 responds with a positive acknowledgment 84. Therefore, the loss of a negative acknowledgment does not compromise the reliability of the system. The situation will simply revert to that of having lost a positive acknowledgment.

Figure 9:
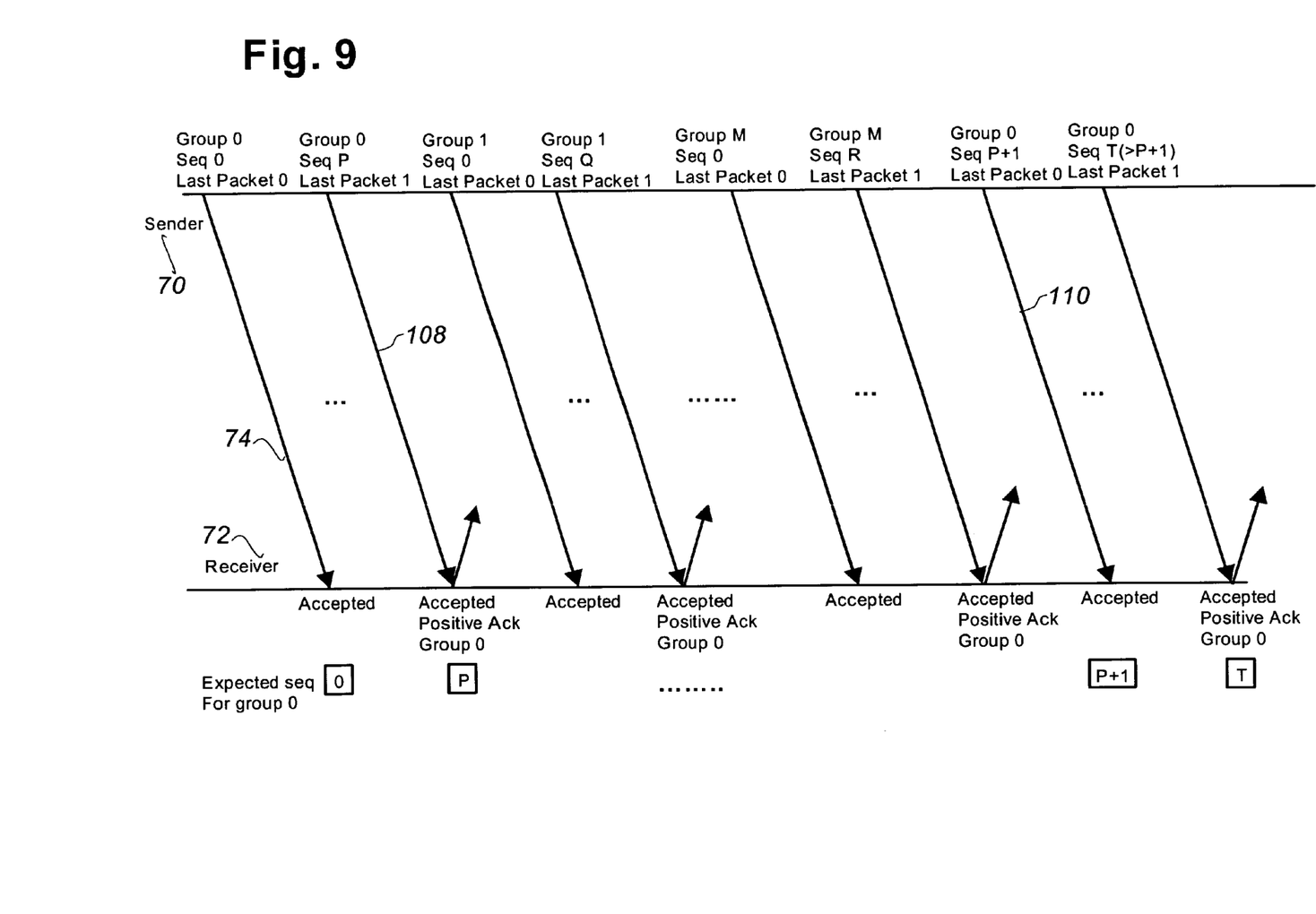
FIG. 9 is a diagram showing an example of data transmission in accordance with the embodiment of the present invention.

FIG. 9 shows how group numbers are recycled, and how sequence numbers are chosen so that recycled groups can still be uniquely identified. Group 0 is transmitted and acknowledged, followed by all groups up to group number M, the maximum group number. The group number chosen for the next unique group is then zero again. However, to avoid confusion on the receiver end between the new group 0 and a possible retransmitted version of the old group 0 which may be retransmitted due to a time-out, the sequence number of the first packet 110 in the new group 0 starts at P+1, which is the last sequence number used for the last packet 108 of previous group 0 plus one. The receiver 72 always keeps track of what the next expected sequence number is for all groups, 0 to M.

In this example, no more than M+1 groups, i.e., Groups 0 to M, can be transmitted and unacknowledged at one time. This is due to the fact that if two groups with the same group number, e.g. 0, were to be transmitted simultaneously, both the sender and the receiver would need to know what sequence number the second group 0 would begin at. This would be impossible to determine, at least by the receiver, as the first group 0 would not have been fully transmitted yet and the last sequence number of the first group 0 would still be unknown. The receiver never knows how many packets a group is composed of. The receiver simply acknowledges a packet if its last packet bit is set.

As described above, the present invention is based on implementing a modified version of a sliding window mechanism on the sender only, and requiring a single acknowledgment from the receiver to acknowledge a group or a window of received packets. It provides high reliability and optimal utilization of communication bandwidth for high-speed communication networks, while requiring very little hardware complexity on the receiver side. No more complexity is necessary on the sender side than in other current sliding window transport mechanism implementations. This results in efficient use of bandwidth, thereby representing a cost saving, and also reduced hardware cost and development time due to reduced complexity of the receiver. The hardware constraints of this invention are generic enough to be applied to almost any high-speed communications network. The invention can be used efficiently in noisy networks; it introduces only negligible processing overhead when no packets are being lost due to noise. The fact that the receiver can be very simple implemented means that the present invention can be quickly and cheaply implemented in existing simple embedded hardware. The present invention is a straightforward method providing rules that are generic enough to be implemented on a wide variety of hardware devices with minimum effort.

The communication system according to the present invention may be suitable used for a transmission medium in which burst errors due to noise are frequent. Specifically, this invention is suitable in cases where acknowledgment and retransmission traffic must be kept to a minimum to maximize utilization.

While particular embodiments of the present invention have been shown and described above, changes and modification may be made to such embodiments without departing from the true scope of the invention.

What is claimed is:

1. A method for transporting data between a sending entity and a receiving entity over a data communication system wherein the sending entity divides data into a plurality of groups which are sequentially indexed with group numbers, each group is segmented into a plurality of packets which are sequentially indexed in each group with sequence numbers, the method comprising the steps of, by the receiving entity:

receiving each packet transmitted over the data communication system;

reading a group number identifying a group and a sequence number of the received packet;

comparing the sequence number with an expected sequence number of the group;

accepting the received packet for further processing when the sequence number of the received packet matches the expected sequence number;

incrementing the expected sequence number of the group when the received packet is accepted;

discarding the received packet when the sequence number of the received packet does not match the expected sequence number;

setting a negative acknowledgment sent indicator when the packet is discarded and no negative acknowledgment sent indicator has been set for the group, the negative acknowledgment sent indicator indicating that a negative acknowledgment has been sent and the receiving entity is waiting for a packet with the expected sequence number;

sending a negative acknowledgment when the sequence number of the received packet is greater than the expected sequence number and the negative acknowledgment sent indicator has not been set;

sending a positive acknowledgment when the received packet is a last packet of the group and the sequence number of the received packet matches or smaller than the expected sequence number.

2. A method as claimed in claim 1 further comprising the step of indicating in the negative acknowledgment the group number and the expected sequence number.

3. A method as claimed in claim 1 further comprising the step of resetting at the receiving entity the negative acknowledgment sent indicator when a packet having the expected sequence number of the group is received.

4. A method as claimed in claim 1 further comprising the step of indicating in the positive acknowledgment the group number.

5. A receiving entity for receiving data transmitted from a sending entity over a data communication system wherein the sending entity divides data into a plurality of groups which are sequentially indexed with group numbers, each group is segmented into a plurality of packets which are sequentially indexed in each group with sequence numbers, the receiving entity comprising:

receiving means for receiving each packet transmitted over the data communication system, each packet having a group number indicating a group and a sequence number;

an expected sequence counter for storing an expected sequence number for the group, the expected sequence counter being incremented when a received packet is accepted for the group;

acceptance determining means for accepting a received packet when the sequence number of the received packet matches the expected sequence number of the group, and for discarding the received packet when the sequence number of the received packet does not match the expected sequence number of the group;

a negative acknowledgment sent indicator which is set when the received packet is discarded and no negative acknowledgment sent indicator has been set for the group, so as to indicate that a negative acknowledgment has been sent and the receiving entity is waiting for a packet with the expected sequence number;

a last packet detector for detecting a last packet of the group; and acknowledgment sending means for sending a negative acknowledgment when the sequence number of the received packet is greater than the expected sequence number and the negative acknowledgment sent indicator has not been set, and sending a positive acknowledgment when the received packet is the last packet of the group and the sequence number of the received packet matches or smaller than the expected sequence number.

6. A receiving entity as claimed in claim 5, wherein the acknowledgment sending means comprises indicating means for indicating in the negative acknowledgment the group number and the expected sequence number.

7. A receiving entity as claimed in claim 5 further comprising resetting means for resetting the negative acknowledgment sent indicator when a packet having the expected sequence number of the group is received.

8. A receiving entity as claimed in claim 6, wherein the indicating means of the acknowledgment sending means indicates in the positive acknowledgment the group number.

9. A method for transporting data between a sending entity and a receiving entity over a data communication system, the method comprising the steps of:

the sending entity dividing data into a plurality of groups which are sequentially indexed with group numbers, each group being segmented into a plurality of packets which are sequentially indexed in each group with sequence numbers;

the sending entity sequentially transmitting the packets of each group to the receiving entity;

the receiving entity receiving each packet transmitted;

the receiving entity reading a group number identifying a group and a sequence number of the received packet, and comparing the sequence number with an expected sequence number of the group;

when the sequence number of the received packet matches the expected sequence number,
  accepting the received packet;
  incrementing the expected sequence number of the group;
  determining whether the received packet is a last packet of the group;
    when the received packet is the last packet, sending a positive acknowledgment to the sending entity; and
    when the received packet is not the last packet, returning to the step of receiving each packet;

when the sequence number of the received packet does not match the expected sequence number,
  discarding the received packet;
  determining whether a negative acknowledgment sent indicator has been set;
  when the negative acknowledgment sent indicator has not been set,
    sending a negative acknowledgment to the sending entity; and
    setting the negative acknowledgment sent indicator; and
  when the negative acknowledgment sent indicator has been set,
    returning to the step of receiving each packet.

10. A method as claimed in claim 9 further comprising the step of the sending entity marking a last packet of each group with a last packet indicator.

11. A method as claimed in claim 10 wherein the step of receiving entity determining whether the received packet is a last packet by detecting the last packet indicator.

12. A method as claimed in claim 9 further comprising the step of receiving entity indicating in the negative acknowledgment the group number and the expected sequence number.

13. A method as claimed in claim 12 further comprising the step of the sending entity re-transmitting to the receiving entity, in response to the negative acknowledgment, the packet having the group number and the expected sequence number indicated in the negative acknowledgment and packets having subsequent sequence numbers of the group.

14. A method as claimed in claim 13 further comprising the step of the receiving entity resetting the negative acknowledgment sent indicator when a packet having the expected sequence number of the group is received.

15. A method as claimed in claim 9 further comprising the steps of:
  the sending entity starting a timer of a predetermined length when the last packet of the group is transmitted; and
  the sending entity re-transmitting all packets of the group to the receiving entity when the timer expires before receipt of the positive acknowledgment.

16. A method as claimed in claim 15 further comprising the step of the sending entity stopping the timer when the positive acknowledgment is received.

17. A method as claimed in claim 15 further comprising the steps of:
  the sending entity stopping the timer when the negative acknowledgment is received; and
  the sending entity restarting the timer when the last packet is retransmitted to the receiving entity.

18. A method as claimed in claim 9 further comprising the steps of:
  when the sequence number of the received packet is smaller than the expected sequence number, the receiving entity determining whether the received packet is the last packet of the group; and
  when the received packet is the last packet, sending a positive acknowledgment to the sending entity.

19. A method as claimed in claim 9 further comprising the step of the receiving entity indicating in the positive acknowledgment the group number.

20. A method as claimed in claim 19 further comprising the steps of:
  the sending entity storing the group number indicated in the positive acknowledgment and the sequence number of the last packet of the group; and
  the sending entity using the group number for a different group, and numbering packets in the different group with numbers starting from the sequence number of the last packet of the group plus one.

21. A data communication system for transporting data between a sending entity and a receiving entity, the data communication system comprising:
  in the sending entity:
    dividing means for dividing data into a plurality of groups which are sequentially indexed with group numbers, each group being segmented into a plurality of packets which are sequentially indexed in each group with sequence numbers;
    packet sending means for sequentially transmitting the packets of each group to the receiving entity;
  in the receiving entity:
    receiving means for receiving each packet transmitted over the data communication system, each packet having a group number identifying a group and a sequence number;
    an expected sequence counter for storing an expected sequence number for the group, the expected sequence counter being incremented when a received packet is accepted for the group;
    acceptance determining means for accepting a received packet when the sequence number of the received packet matches the expected sequence number of the group, and for discarding the received packet when the sequence number of the received packet does not match the expected sequence number of the group;
    a negative acknowledgment sent indicator which is set when the received packet is discarded and no negative acknowledgment sent indicator has been set for the group, so as to indicate that a negative acknowledgment has been sent and the receiving entity is waiting for a packet with the expected sequence number;
    a last packet detector for detecting a last packet of the group; and
    acknowledgment sending means for sending a negative acknowledgment when the sequence number of the received packet is greater than the expected sequence number and the negative acknowledgment sent indicator has not been set, and sending a positive acknowledgment when the received packet is the last packet of the group and the sequence number of the received packet matches or smaller than the expected sequence number.

22. A data communication system as claimed in claim 21 wherein the sending entity further comprises means for marking a last packet of each group with a last packet indicator, and the last packet detector of the receiving entity detects the last packet indicator.

23. A data communication system as claimed in claim 21 wherein the receiving entity further comprises indicating means for indicating in the negative acknowledgment the group number and the expected sequence number.

24. A data communication system as claimed in claim 23 wherein the packet sending means of the sending entity re-transmits to the receiving entity, in response to the negative acknowledgment, the packet having the group number and the expected sequence number indicated in the negative acknowledgment and packets having subsequent sequence numbers of the group.

25. A data communication system as claimed in claim 24 wherein the receiving entity further comprises resetting means for resetting the negative acknowledgment sent indicator when a packet having the expected sequence number of the group is received.

26. A data communication system as claimed in claim 21 wherein the sending entity further comprises:
a timer of a predetermined length; and
timer setting means for starting the timer when the last packet of the group is sent; and
wherein the packet sending means re-transmits all packets of the group to the receiving entity when the timer expires before receipt of the positive acknowledgment.

27. A data communication system as claimed in claim 26 wherein the timer setting mean stops the timer when the positive acknowledgment is received.

28. A data communication system as claimed in claim 26 wherein the timer setting means stops the timer when the negative acknowledgment is received, and restarts the timer when the last packet is retransmitted to the receiving entity.

29. A data communication system as claimed in claim 23, wherein the indicating means of the receiving entity indicates in the positive acknowledgment the group number.

30. A data communication system as claimed in claim 29 wherein the sending entity further comprises a storing means for storing the group number indicated in the positive acknowledgment and the sequence number of the last packet of the group, and the dividing means of the sending entity uses the group number for a different group and numbers packets in the different group with numbers starting from the sequence number of the last packet of the group plus one.

31. A method for transporting data between a sending entity and a receiving entity over a data communication system, the method comprising the steps of:
the sending entity dividing data into a plurality of groups which are sequentially indexed with group numbers, each group being segmented into a plurality of packets which are sequentially indexed in each group with sequence numbers;
the sending entity marking a last packet of each group with a last packet indicator.
the sending entity sequentially transmitting the packets of each group to the receiving entity;
the receiving entity receiving each packet transmitted;
the receiving entity reading a group number identifying a group and a sequence number of the received packet, and comparing the sequence number with an expected sequence number of the group;
the receiving entity accepting the received packet for further processing when the sequence number of the received packet matches the expected-sequence number;
the receiving entity incrementing the expected sequence number of the group when the received packet is accepted;
the receiving entity discarding the received packet when the sequence number of the received packet does not match the expected sequence number;
the receiving entity setting a negative acknowledgment sent indicator when the packet is discarded and no negative acknowledgment sent indicator has been set for the group, the negative acknowledgment sent indicator indicating that a negative acknowledgment has been sent and the receiving entity is waiting for a packet with the expected sequence number;
the receiving entity sending a negative acknowledgment indicating the group number and the expected sequence number when the sequence number of the received packet is greater than the expected sequence number and the negative acknowledgment sent indicator has not been set;
the sending entity re-transmitting to the receiving entity, when the negative acknowledgment is received, the packet having the group number and the expected sequence number indicated in the negative acknowledgment and packets having subsequent sequence numbers of the group;
the receiving entity detecting a last packet of the group by detecting the last packet indicator;
the sending entity starting a timer of a predetermined length when the last packet of the group is sent;
the receiving entity sending a positive acknowledgment indicating the group number when the received packet is the last packet of the group and the sequence number of the. received packet matches or smaller than the expected sequence number;
the sending entity re-transmitting all packets of the group to the receiving entity when the timer expires before receipt of the positive acknowledgment;
the sending entity stopping the timer when the positive acknowledgment is received;
the sending entity storing the group number indicated in the positive acknowledgment and the sequence number of the last packet of the group; and
the sending entity numbering packets in a different group having the group number starting from the sequence number of the last packet plus one.

32. A data communication system for transporting data between a sending entity and a receiving entity, the data communication system comprising:
in the sending entity:
dividing means for dividing data into a plurality of groups which are sequentially indexed with group numbers, each group is segmented into a plurality of packets which are sequentially indexed in each group with sequence numbers;
means for marking a last packet of each group with a last packet indicator;
packet sending means for sequentially transmitting the packets of each group to the receiving entity;
a timer of a predetermined length;

timer setting means for starting the timer when the last packet of the group is transmitted, and stopping the timer when a positive acknowledgment or a negative acknowledgment is received;

in the receiving entity:

receiving means for receiving each packet transmitted over the data communication system, each packet having a group number identifying a group and a sequence number;

an expected sequence counter for storing an expected sequence number for the group, the expected sequence counter being incremented when a received packet is accepted for the group;

acceptance determining means for accepting the received packet when the sequence number of the received packet matches the expected sequence number of the group, and for discarding the received packet when the sequence number of the received packet does not match the expected sequence number of the group;

a negative acknowledgment sent indicator which is set when the received packet is discarded and no negative acknowledgment sent indicator has been set for the group, so as to indicate that a negative acknowledgment has been sent and the receiving entity is waiting for a packet with the expected sequence number;

resetting means for resetting the negative acknowledgment sent indicator when a packet having the expected sequence number of the group is received;

a last packet detector for detecting the last packet of the group having the last packet indicator;

acknowledgment sending means for sending a negative acknowledgment when the sequence number of the received packet is greater than the expected sequence number and the negative acknowledgment sent indicator has not been set, and sending a positive acknowledgment when the received packet is the last packet of the group and the sequence number of the received packet matches or smaller than the expected sequence number;

indicating means for indicating the group number and the expected sequence number in the negative acknowledgment and the positive acknowledgment;

wherein the packet sending means of the sending entity re-transmits to the receiving entity the packet having the group number and the expected sequence number indicated in the negative acknowledgment and packets having subsequent sequence numbers of the group when the negative acknowledgment is received, and retransmits all packets of the group when the timer expires before the positive acknowledgment is received.

* * * * *